Feb. 28, 1961 L. A. PRICE 2,973,469
FAST RESPONSE DIRECT CURRENT POWER SUPPLY FOR INDUCTIVE LOADS
Filed June 13, 1955 2 Sheets-Sheet 1
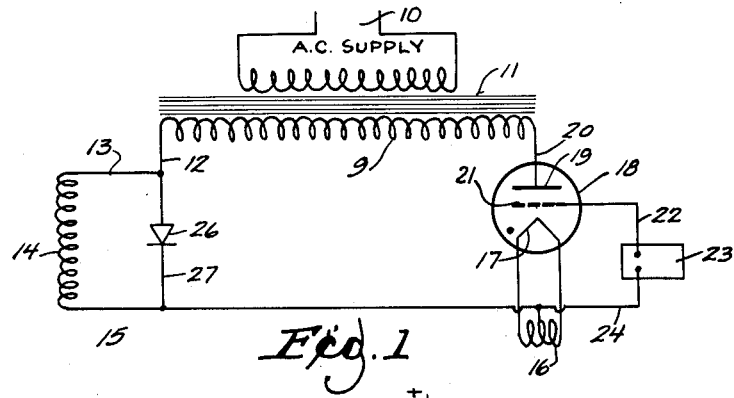
Fig. 1
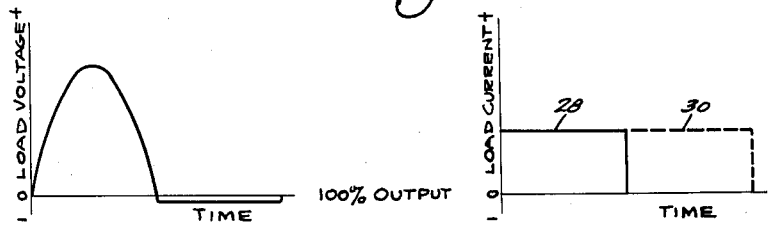
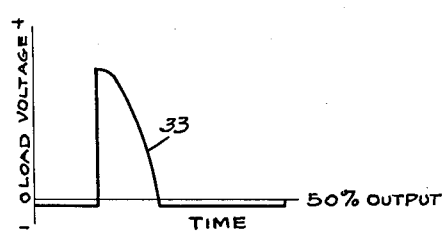
Fig. 2
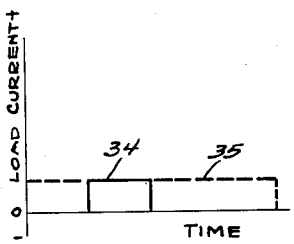
Fig. 5
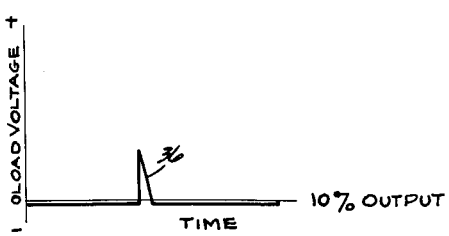
Fig. 3
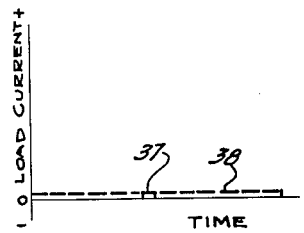
Fig. 6
Fig. 4
Fig. 7
INVENTOR.
LESTER A. PRICE
BY
Wheeler, Wheeler & Wheeler
ATTORNEYS Feb. 28, 1961 L. A. PRICE 2,973,469
FAST RESPONSE DIRECT CURRENT POWER SUPPLY FOR INDUCTIVE LOADS
Filed June 13, 1955 2 Sheets-Sheet 2
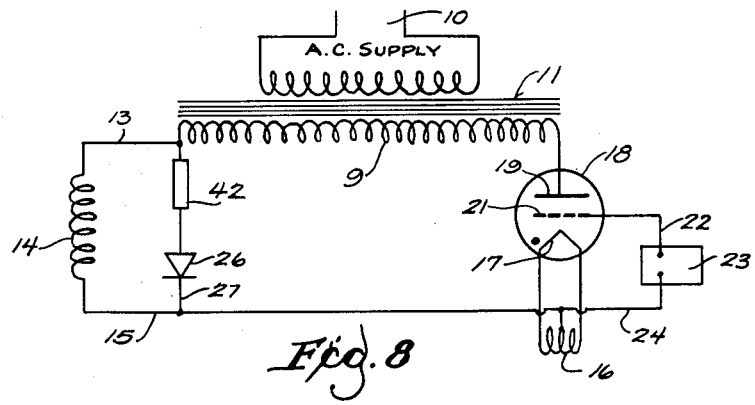
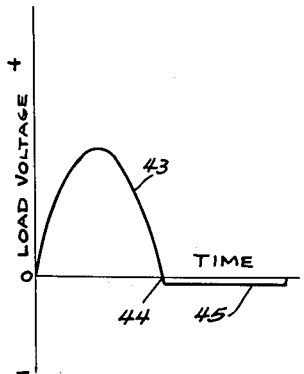
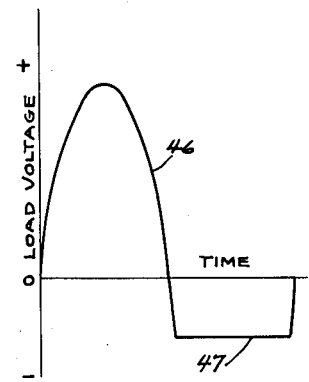
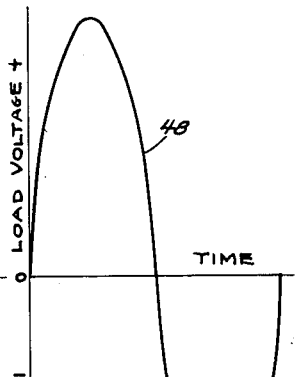
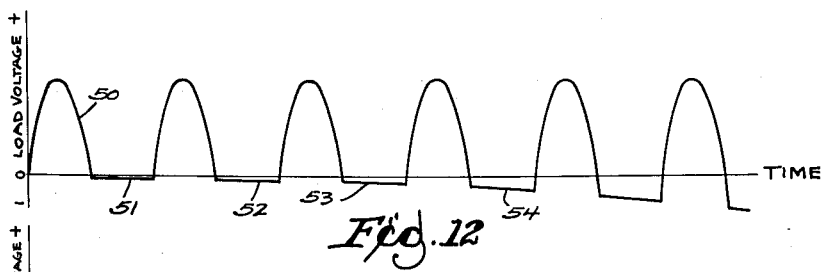
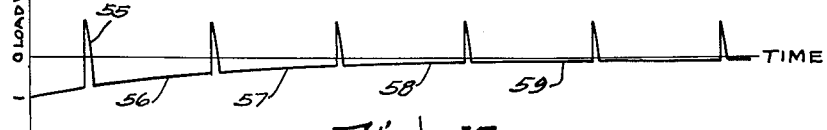
INVENTOR.
LESTER A. PRICE
BY
Wheeler, Wheeler & Wheeler
ATTORNEYS

United States Patent Office 2,973,469
Patented Feb. 28, 1961

2,973,469

FAST RESPONSE DIRECT CURRENT POWER SUPPLY FOR INDUCTIVE LOADS

Lester A. Price, Milwaukee, Wis., assignor to Harnischfeger Corporation, Milwaukee, Wis., a corporation of Wisconsin Filed June 13, 1955, Ser. No. 514,881

2 Claims. (Cl. 321—32)

This invention relates to a fast response direct current power supply for inductive loads.

It is conventional in the art to employ a space discharge device known as a thyratron in a half-wave rectifier circuit as a direct current power supply for an inductive load. To sustain current flow through the load when the thyratron is cut off, a back rectifier is connected in circuit with the inductive load to provide a sustaining circuit for transient load decay current. It is also conventional to regulate the effective value of the direct current in the load circuit by control of the thyratron grid to selectively fire the thyratron over a given fractional part of the positive pulse of alternating current voltage impressed on the thyratron anode. The grid circuit conventionally comprises an alternating current voltage source and means for shifting the phase angle of said voltage with respect to the alternating current voltage impressed on the thyratron anode.

The present invention has to do with speeding the rate of change of current in the load circuit in response to changes in grid excitation by varying the electrical time constant of the circuit. By inserting a ballast resistor in the back rectifier circuit, the ratio of load circuit inductance to load circuit resistance is decreased with a corresponding decrease in the electrical time constant of the circuit and a resultant increase in its speed of response to changes in grid excitation.

According to my invention the ballast resistance is disposed in the back rectifier circuit, in series with the back rectifier and in parallel with the inductive load with reference to the alternating current source of voltage.

In this specific circuit the instantaneous voltage impressed on the thyratron anode and load may be increased in proportion to the increase in back rectifier circuit resistance, without increasing the average load voltage.

In the drawings:

Fig. 1 is a circuit diagram showing a conventional back rectifier in circuit with an inductive load.

Figs. 2, 3 and 4 are wave-form diagrams showing the instantaneous load voltage in the load circuit of the device of Fig. 1 for various conditions of grid excitation.

Figs. 5, 6 and 7 are wave-form diagrams showing steady state current flow in the load circuit corresponding to the load voltage conditions shown in Figs. 2, 3 and 4.

Fig. 8 is a circuit diagram of a power supply embodying my invention.

Fig. 9 is a wave-form diagram showing instantaneous load voltage in the load circuit of the device of Fig. 1.

Figs. 10 and 11 are wave-form diagrams showing instantaneous load voltage in the load circuit of the device of Fig. 8, for various conditions of impressed voltage and ballast resistance.

Figs. 12 and 13 are wave-form diagrams illustrating transient conditions in the circuit of Fig. 8.

As illustrated in the conventional half-wave rectifier circuit of Fig. 1, alternating current from line 10 is supplied to transformer 11, the transformer secondary coil 9 having one terminal connected by lines 12 and 13 to one terminal of an inductive load 14 which may be the field coil of a conventional eddy current clutch or brake. The other terminal of the inductive load 14 is connected through line 15 to the center tap of the filament winding 16 of a transformer which supplies current to the filament 17 of thyratron 18. The thyratron anode 19 is connected through line 20 to the other terminal on the transformer coil 9 to complete the load circuit of the rectifier.

The grid 21 of the thyratron 18 may be connected through line 22 to conventional grid control apparatus, for example a phase shifting device 23, and through return line 24 to the center tap of filament winding 16.

A back rectifier 26, desirably of the dry disc type, is connected in shunt line 27 which parallels the inductive load 14.

Conventionally thyratrons are designed to have a slightly negative critical grid voltage. When the applied grid voltage exceeds the critical grid voltage and the anode is of a positive polarity with respect to the filament (cathode), anode conduction or firing occurs. The grid exerts no further control until the anode voltage is brought to zero or becomes of negative polarity with respect to the filament. If the grid is excited to the firing point throughout each positive pulse of alternating current voltage supplied by transformer 11, the tube will fire throughout the complete half-cycle of the positive pulse and current will flow through the inductive load 14 for the full half-cycle. The instantaneous voltage impressed on the load in this circumstance is indicated in Fig. 2.

Since the polarity of the back rectifier 26 is opposite that of the tube 18, no current will flow through the back rectifier during the period of time that the thyratron conducts current.

Inclusion of the back rectifier in the circuit, however, provides for continuance of current flow through the load during that period of time when the thyratron is cut off. Decaying current in the inductive load results in an induced voltage which has a polarity to induce flow of current in the load in the same direction as the current originally supplied by the thyratron. The current thus induced flows in the circuit including the back rectifier 26, the load 14 and lines 13, 15 and 27.

Because of the highly inductive characteristic of the load 14, current flow therethrough will not fluctuate in instantaneous correspondence with the voltage delivered by the thyratron but will reach a steady state average value substantially equivalent to that delivered by a direct current source. The level of current will be determined by the percentage of time during which the thyratron conducts. In the diagram shown in Fig. 5, the average current flowing through the load when the thyratron is firing is indicated in full lines by reference character 28, the current sustained in the back rectifier circuit being indicated in dotted lines by reference character 30. The current conditions shown in Fig. 5 correspond to the voltage conditions shown in Fig. 2. Accordingly, the thyratron supplies current for fifty percent of the time, the back rectifier sustaining current flowing for the remaining fifty percent of the time.

Figs. 3 and 6 illustrate the condition when the phase shifter 23 is so adjusted as to fire the tube 18 through only one-half of the positive pulse of voltage delivered by transformer 11. The voltage curve is identified by reference character 33. The current flowing through the inductive load during that period of time which the thyratron conducts is indicated in full lines by reference character 34, the current sustained in the back rectifier circuit being indicated in dotted lines by reference character 35. Under the circumstances illustrated in Fig. 3, the thyratron supplies current during one-fourth of the total time cycle, the back rectifier sustaining current for the remaining three-fourths of the time cycle. The average value of steady state current shown in Fig. 6 is accordingly only fifty percent of its value shown in Fig. 5.

Fig. 4 illustrates a condition in which the phase shifter 23 is adjusted to permit firing of the tube for only ten percent of the positive pulse delivered by transformer 11. The voltage curve is indicated by reference character 36. The current resulting from thyratron voltage is indicated in full lines by reference character 37, the current sustained in the back rectifier circuit being indicated in dotted lines by reference character 38. Accordingly, the thyratron supplies current for only one-twentieth of the total time and the back rectifier sustains current for the remaining time. The average value of current in Fig. 7 is only ten percent of its average value shown in Fig. 5.

The foregoing explanation relates to steady state conditions in the device. In a transient situation, for example when the phase shifter is adjusted from the condition shown in Figs. 2 and 5 to the condition shown in Figs. 3 and 6, the current flowing through the load must change from its value shown at 28 in Fig. 5 to its value shown at 34 in Fig. 6.

The time constant of the circuit is the ratio of circuit inductance to circuit resistance ($L/R$). The time required for the load current to decay from one value to another is represented by the formula:

$$t = \frac{L}{R} \log e \frac{I_1}{I_2}$$

where "$t$" is the time in seconds, "$L$" is the load inductance in henrys, "$R$" is the load resistance in ohms, "$I_1$" is the current in the load in the first setting of the grid controller and "$I_2$" is the desired current in the new setting of the grid controller.

A similar formula could be shown for a transient increase in current. For simplicity in explanation, however, only the formula for transient decay is given.

Because of this time delay, the current flowing in the load circuit will not reach its new value $I_2$ instantaneously. This time delay can be reduced by reducing the time constant of the circuit as hereinafter proposed.

Moreover, in automatically regulated power supplies in which feedback is introduced in the grid circuit, stabilizing networks in the grid circuit are conventionally needed to reduce the rate of grid response to feedback signal changes, thus compensating for sluggishness of response of the controlled field, thereby reducing hunting and erratic operation. In the circuit of the present invention, however, such stabilizing grid networks may be eliminated as the speed of response of the load circuit is increased.

I propose to reduce the electrical time constant of the load circuit by increasing the value of "$R$" in the time constant formula given above. My preferred circuit for accomplishing this objective is illustrated in Fig. 8 where the reference characters are the same as those used in Fig. 1. In this circuit, however, I include a ballast resistor 42 in series with the back rectifier 26, the back rectifier and ballast resistor being in parallel with the load 14 with reference to the alternating current source of voltage.

Ballast resistance 42 may have any desired ohmic value. Even a small resistance will decrease the time constant of the circuit. Ballast resistance 42, however, has been empirically determined to be optimum when its ohmic resistance is two and one-half times the ohmic resistance of the load, although for slightly inferior results it could be at a higher or lower value. Too much ballast resistance, of course, would too greatly reduce the sustaining current flowing through the back rectifier circuit and not enough resistance would not achieve the potential for reduction of the time constant inherent in the circuit.

The time required for the current to decay in the circuit shown in Fig. 8, where ballast resistance 42 has an ohmic value 2.5 times the resistance of the load 14, is:

$$t = \frac{L}{3.5R} \log e \frac{I_1}{I_2}$$

where the symbols are the same as before indicated. It is evident that the response of the circuit of Fig. 8 is much faster than the circuit of Fig. 1. The circuit of Fig. 8 in which the resistance is 2.5R reduces the time of circuit response to 28.5 percent of the time required in the circuit of Fig. 1. The circuit of Fig. 8 permits a substantial increase in instantaneous load and anode voltage without a corresponding increase in average load voltage. This is because the IR drop through the ballast resistor during the period of time when the back rectifier is conducting is negative with respect to the impressed voltage during the period of time when the back rectifier is not conducting. Accordingly, although the peak instantaneous voltage on the load may be doubled (for example) the average voltage on the load will be no more than in the circuit of Fig. 1 provided the resistance of ballast resistor 42 is set at a value such that the negative IR drop in the back rectifier circuit balances the increased voltage. Increased instantaneous load voltage, of course, is desirable as a forcing voltage to increase the speed of circuit response on starting, or when the grid signal voltage calls for more output.

In Fig. 9 I graph instantaneous steady state load voltage against time for the circuit of Fig. 1 assuming conduction of the thyratron throughout the positive pulse of anode voltage. Curve 43 above the reference line represents instantaneous values of load voltage. At point 44 thyratron cuts off because its anode voltage is negative and back rectifier 26 conducts. The small negative IR drop in the back rectifier is represented by curve 45. Accordingly, the average load voltage is represented by the area under curve 43 less the area under curve 45.

Fig. 10 represents conditions in the circuit of Fig. 8 with a small value of ohmic resistance for ballast resistor 42. An increased instantaneous voltage, represented by curve 46, may be impressed on the load in view of the increased IR drop in the back rectifier circuit, represented by curve 47. The average value of load voltage will be the same as in Fig. 9, but a higher peak voltage is made possible.

Fig. 11 represents a still further increase in impressed instantaneous load voltage 48 made possible by further increasing the ohmic resistance of the ballast resistor 42, the increased balancing IR drop being represented by curve 49.

In Figs. 12 and 13, I illustrate transient conditions. In Fig. 12 an overvoltage represented by instantaneous voltage curve 50 is impressed on the load and thyratron anode. The overvoltage accelerates initial current flow through the apparatus being controlled. Because of the inductive character of the load, however, load current does not build up instantly, as aforesaid, and several cycles of the impressed voltage curve accrue during which the load current in the load current sustaining circuit increases toward steady state conditions. As the load current increases the IR drop in the back rectifier circuit increases, as indicated by curves 51, 52, 53, 54. Thus the average value of load voltage is gradually reduced as the load current is increased to its steady state value illustrated in Fig. 11.

In Fig. 13 the converse of Fig. 12 is illustrated. Curve 55 illustrates a greatly reduced load voltage by retardation of the firing point during the positive pulse of anode voltage, curves 56, 57, 58 and 59 indicating gradual reduction in the IR drop through the ballast resistor circuit as a new steady state load current of reduced value is reached.

For both conditions represented in Figs. 12 and 13, the time required to complete the transient cycle is shortened because of the increase in resistance in the load current sustaining back rectifier circuit.

From the foregoing it is clear that in the circuit of my invention in which the ballast resistor is in series with the back rectifier, and the back rectifier and ballast resistor are in series-parallel with the load, a forcing overvoltage may be applied to the circuit without increasing the average voltage impressed on the load. Moreover, the increase of resistance in the current sustaining circuit reduces the electrical time constant of the circuit to speed the response of the circuit to grid signal changes.

I claim:

1. In a direct current power supply for an inductive load including an alternating current source, a fractional wave rectifier in circuit with said load and source, and a load current sustaining circuit including a back rectifier for sustaining inductive load decay current during inaction of the fractional wave rectifier, the improvement to decrease the time response of the circuit to transient changes in load current requirements and to permit application of forcing instantaneous peak overvoltages to the load without increasing the average load voltage comprising a ballast resistor in series with said back rectifier and in parallel with the load, said ballast resistor having an ohmic value sufficiently great to increase the proportion of resistance to inductance in said current sustaining circuit enough to materially reduce the time constant of the circuit and to produce an IR drop in the current sustaining circuit high enough to permit such forcing instantaneous peak overvoltages without increase in the average load voltage.

2. The device of claim 1 in which the ohmic value of said ballast resistor is more than double the ohmic value of the inductive load.

References Cited in the file of this patent

UNITED STATES PATENTS

| | | |
|---|---|---|
| 1,928,812 | Dawson | Oct. 3, 1933 |
| 1,966,077 | Nyman | July 10, 1934 |
| 1,982,007 | Logan | Nov. 27, 1934 |
| 1,982,329 | Stogoff | Nov. 27, 1934 |
| 2,541,182 | Winther | Feb. 13, 1951 |
| 2,673,947 | Winther | Mar. 30, 1954 |